L. C. GEHRING.
METHOD AND APPARATUS FOR SEPARATING FIBROUS AND NON-FIBROUS MATERIALS IN FOOD PRODUCTS.
APPLICATION FILED DEC. 28, 1918.
1,314,864.
Patented Sept. 2, 1919.
3 SHEETS—SHEET 1.
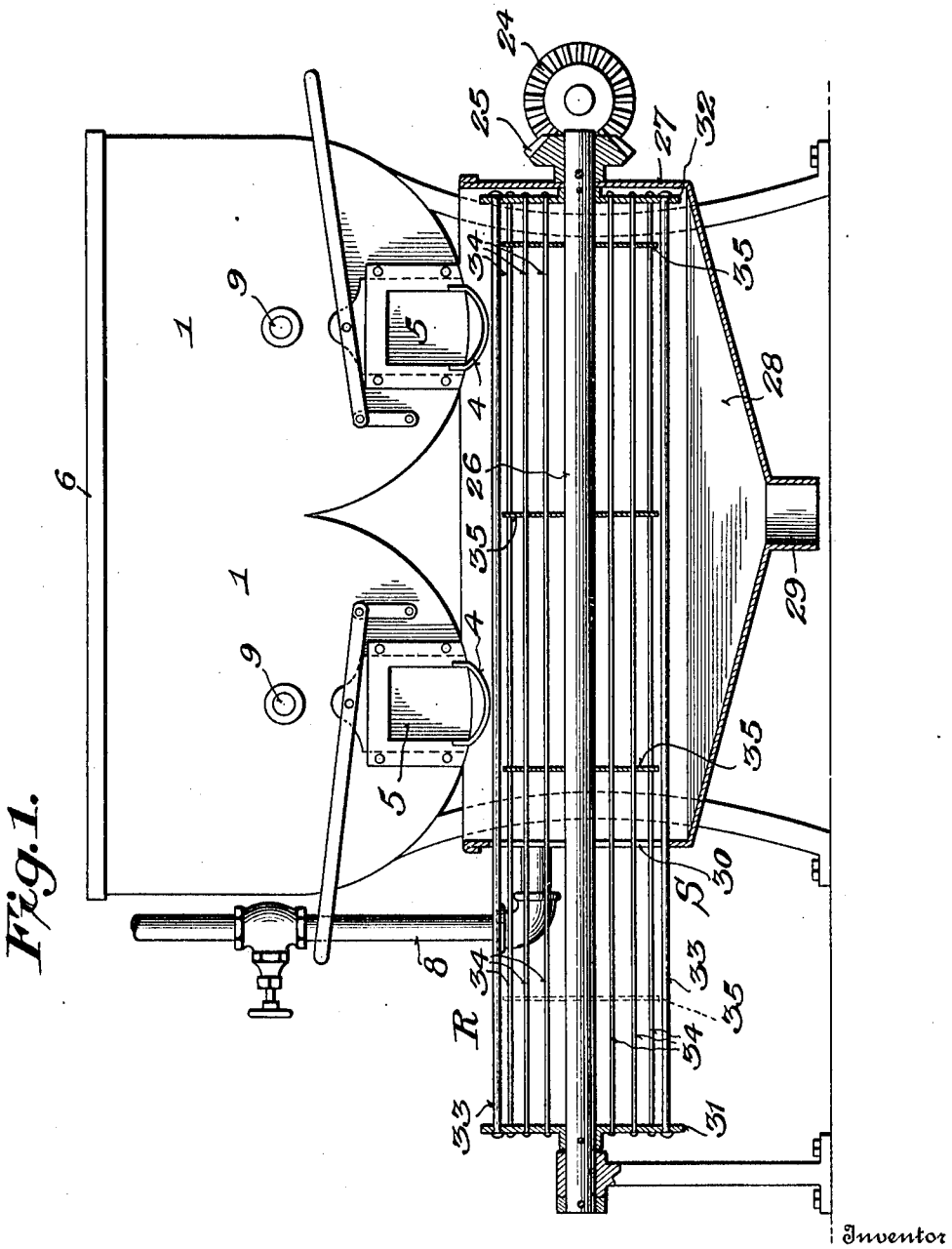

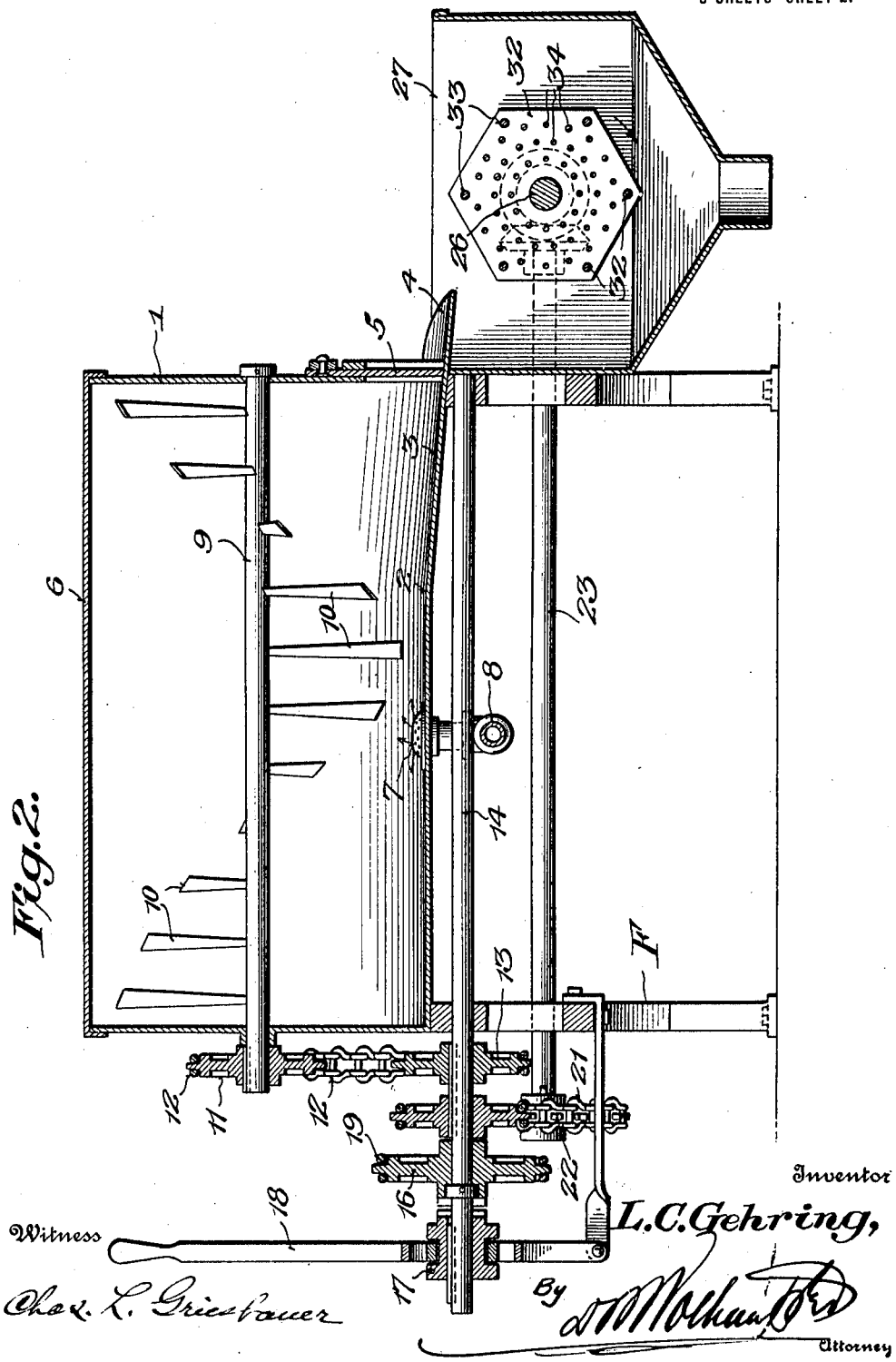

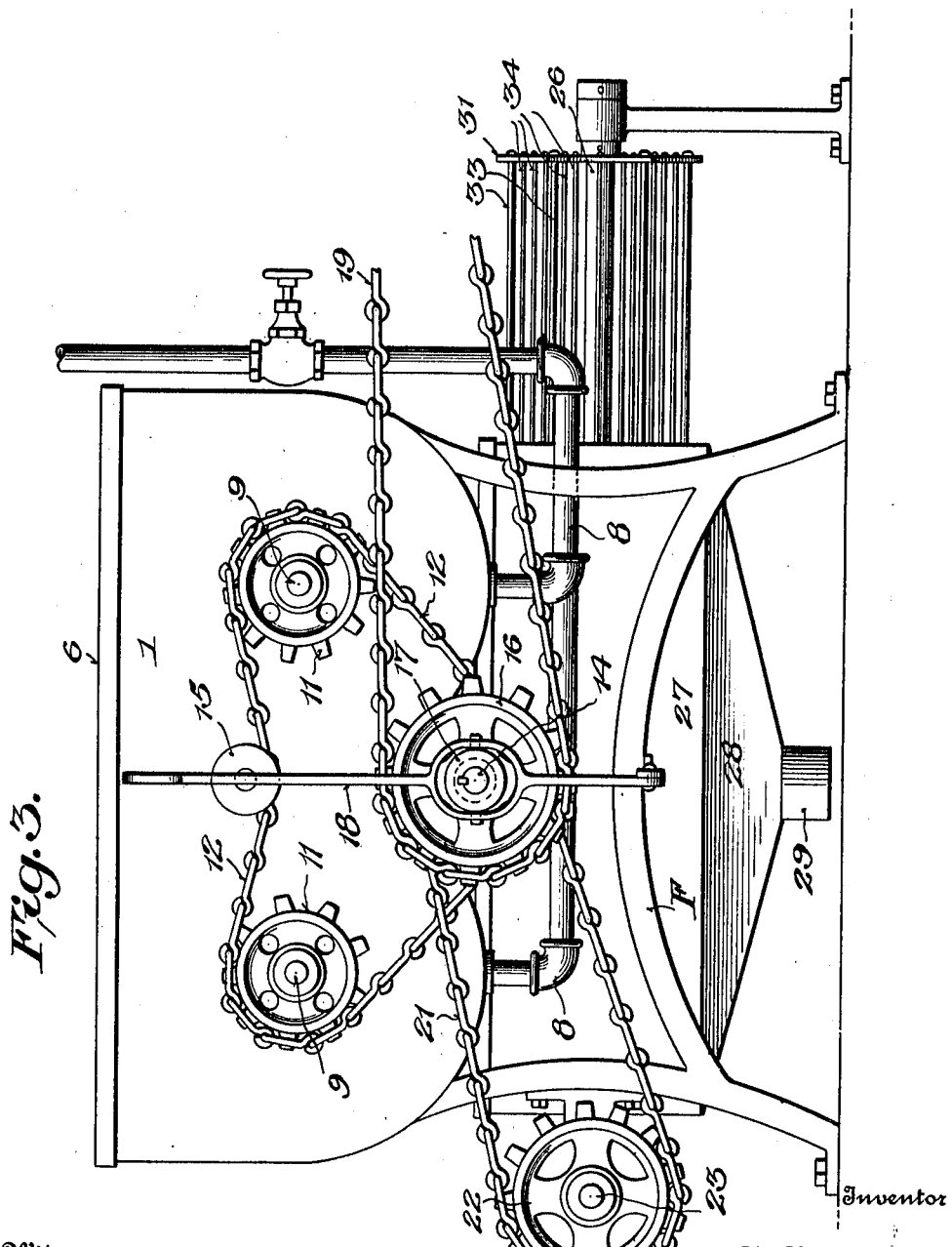

UNITED STATES PATENT OFFICE.

LOUIS C. GEHRING, OF CIRCLEVILLE, OHIO.

METHOD AND APPARATUS FOR SEPARATING FIBROUS AND NON-FIBROUS MATERIALS IN FOOD PRODUCTS.

1,314,864. Specification of Letters Patent. Patented Sept. 2, 1919.

Application filed December 28, 1918. Serial No. 268,656.

*To all whom it may concern:*

Be it known that I, LOUIS C. GEHRING, citizen of the United States, residing at Circleville, in the county of Pickaway and State of Ohio, have invented certain new and useful Improvements in Methods and Apparatus for Separating Fibrous and Non-Fibrous Materials in Food Products, of which the following is a specification.

This invention relates to a method and apparatus for separating the fibrous and non-fibrous materials in food products and possesses special utility in its application for separating and removing the silk, husks and hard shells from a mass of edible corn or equivalent food.

The apparatus heretofore employed for removing silk and other foreign particles from the corn after it has been cut from the cob, has been more or less faulty and defective with the result of producing inferior grades of canned corn, and at the same time involving considerable expense through waste. That is to say, machinery heretofore employed for accomplishing the separation of foreign particles from the kernels has been of such a nature that it soon becomes clogged with silk and other foreign matter whereby its primary function is defeated. And, furthermore, the matter of keeping machines of this character in a proper sanitary condition is difficult, since, owing to the labor involved in taking apart and cleaning, many operators leave considerable corn and waste matter in the machine which sours and ferments while on the other hand if the waste material is removed, considerable good corn is carried along with the waste, and much edible corn that might otherwise be used is lost.

Accordingly, the invention has primarily in view a novel method and machine for rendering the ultimate product more wholesome and of a higher quality by thoroughly removing the silk which usually adheres to the raw kernels of the corn as it comes from the cutting apparatus and also removing pieces of husk and hard shells by the same operation.

A further and distinctive object of the invention is to render the silk and like particles of such a character that they may be readily separated from the corn itself. That is to say, the invention contemplates an apparatus which provides for a preliminary treatment of the corn which takes all of the life or stiffness out of the silk and pieces of husk whereby they become relatively limp or flaccid so that their separation from the comminuted mass may be readily assured.

A still further object of the invention is to provide a novel de-silker or separator device which not only thoroughly cleans the corn as it passes therethrough, but at the same time preserves its integrity and prevents waste, since it presents no parts which would collect or accumulate edible portions of the mass being operated upon. In connection with this further important object of the invention it is to be noted that it is proposed to provide a separating device which is susceptible of being cleaned with great facility in a minimum space of time, and as often as conditions require without dismantling the machine or disturbing any of its operative parts.

With the above and other objects in view, which will more readily appear as the nature of the invention is better understood, the preferable machine employed to carry out the method consists in the novel construction, combination and arrangement of parts hereinafter more fully described, illustrated and claimed.

A preferred and practical arrangement of the invention is shown in the accompanying drawings, in which:—

Figure 1 is a front elevation of my apparatus, partly in section, and showing the separating reel.

Fig. 2 is a vertical sectional view of the apparatus.

Fig. 3 is a rear end view thereof.

Similar references designate corresponding parts throughout the several figures of the drawings.

In the preparation of corn for canning purposes, the kernels of the raw corn are first severed from the cob by the knives of a suitable cutting machine, and the corn thus severed from the cob usually contains considerable pieces of silk or pieces of husk which it has been impossible to remove in the husking operation, and in order to prepare the corn in its most wholesome and palatable form, it is of course desirable to remove these foreign particles. Although machines have been heretofore provided for the purpose of removing this silk and portions of husk, cob and shells, the separation has been more or less deficient, and with a view to correcting this fault the present invention has particularly in view a novel form of apparatus which has provision for subjecting the mass of corn after it comes from the cutting machine to a steam bath which has the effect of rendering the silk, husk, etc., particles flimsy or flaccid whereby as they encounter the separating means in the course of the passage of the mass of corn through the apparatus, they will be arrested by embracing or entwining themselves about the individual members of the novel separating means hereinafter described.

Accordingly, in order to carry out the foregoing object the present apparatus embodies in its organization a suitable vat or tub unit designated generally as 1, and which may be duplicated as often as desired, according to the required capacity of the machine as may be observed for instance, from Fig. 1, which shows two units. These vats or tubs are preferably provided with a transversely rounded bottom portion 2 slightly inclined at one end as at 3, and may also be provided as shown with the delivery spout 4, controlling gate 5 and cover or sealing lid 6, the latter rendering the vat substantially air-tight, whereby steam admitted from the outlet nozzle or rose 7 of a steam supply pipe 8 may be confined within the chamber of the vat to thoroughly subject the corn to the desired heat and sterilizing temperature. As will also be observed from Fig. 2, it is proposed to provide the vat with a longitudinally disposed shaft 9 having thereon a helical flight of spaced paddles 10 which are adapted to thoroughly agitate the comminuted mass of corn placed within the chamber of the vat, and at the same time operate as a screw to feed the corn toward the discharge spout 4.

With the above arrangement it will be apparent that when the raw corn is placed in the chamber of the vat, it will be thoroughly agitated in the presence of steam issuing from the nozzle 7, and at this point it may be noted that when the raw corn is placed in the vat there is also mixed therewith a suitable quantity of seasoning material, syrup, corn starch and the like which also becomes thoroughly mixed with the mass of corn whose temperature is of course raised to a certain degree but not sufficient to cook the same, as this part of the operation is reserved until after the corn has had all of the silk, husk and like particles removed by the novel separating means to be presently referred to. However, this preliminary heating serves the double function of assisting in the mixing of the seasoning ingredients with the mass and also taking the stiffness or life out of the silk, husk portions, hard shells of the corn and like particles, as previously indicated.

One end of the agitator shaft 9 is provided with a sprocket 11 which receives a chain 12 operated by a driving sprocket 13 carried upon a main driving shaft 14 as shown in Figs. 2 and 3. The said chain 12, in the arrangement shown serves to impart motion to both of the sprocket wheels 11—11 of the two units 1—1, and for the purpose of taking up the slack in the chain 12, the well known expedient of an idler pulley 15 may be employed. The main drive shaft 14 which has keyed thereto the sprocket 13 also has loosely fitted thereon a relatively large power sprocket 16 adapted to coöperate with a suitable clutch device 17 including a handle 18 to connect and disconnect the shaft 14 with the source of power which is communicated through the sprocket chain 19. Between the sprocket wheels 13 and 16, on the shaft 14, and keyed thereto, is another sprocket wheel 20 intended to operate a chain 21 meshing with the spurs of a sprocket wheel 22 carried upon a shaft 23 journaled at one side of the frame F of the apparatus. Thus, it will be seen that the drive shaft 14 will in turn operate the shaft 23 through the sprocket chain, and sprocket connections 20, 21, and 22. The end of the shaft 23 opposite sprocket wheel 22 may be provided with a bevel gear 24, which latter in turn meshes with a bevel gear 25 carried upon the shaft 26 of the separating unit and designated generally as S.

This separating unit S constitutes an essential part of the apparatus, and is particularly distinctive, because of the fact that it includes a novel cylindrical screen member which separates and collects pieces of silk, husk and the like from the mass of heated corn which passes diametrically through the same while in motion. Referring to the special features and characteristics of this separating unit, it may be clearly observed from Figs. 1 and 2 that the same includes a suitable hopper 27 having an inclined bottom 28 and delivery spout 29 with one end wall thereof open as indicated at 30. This hopper 27 occupies a position below the vat units 1—1, and contains a novel separating reel designated as R disposed beneath the discharge spouts 4 of the units 1 whereby as the combined agitator and conveyer within the vat expels the comminuted mass of corn and seasoning ingredients, the entire mass will be caused to pass diametrically through the separating reel which is rotating, before passing out of the delivery spout 29 of the hopper to the cooker.

The separating reel R, includes, as previously indicated, the shaft 26, and essentially consists of this element and the end frames 31 and 32 which are spaced apart and maintained in their proper relation by means of suitable spacers or tie rods 33. These end frames 31 and 32 constitute bases or anchoring walls for a multiplicity of separating wires 34 which are preferably arranged in a plurality of concentric series from the periphery to the axis of the reel which is shaft 26. These wires 34 are preferably spaced about one inch apart in the circumference of a circle, and the wires of the adjoining concentric circular series are arranged so that they are not in the same radial plane as those of the first series, etc. In other words while the wires 34 are placed in concentric circular series, they are, with reference to the diameter of the reel, arranged in staggered relation, thereby greatly contributing to the screening effect produced upon the corn fed from the spouts 4 of the vats.

As the temperature of the corn issuing from the vats has been raised by the steam discharged into the mass, all of the stiffness or life will be taken out of the silk, husks and the like, whereby as the mass passes through the reel the said silk, husks, etc. will have a tendency to wrap around or embrace the wires 34 and cling thereto while the good part of the corn passes on through to the bottom of the hopper and out through the discharge opening 29. Thus, in this way it is proposed to separate the undesirable portions of the mass from the edible part of the corn to render the latter uniformly clean and free from foreign particles which would otherwise pass on through to the cooker, and from thence into the cans.

As will be observed from Figs. 1 and 3 the reel R is of considerably greater length than the hopper 27 as the one end thereof projects through the opening 30 in one of the hopper walls. The object of this particular arrangement is to provide for cleaning the wires of the reel and conveniently carrying the waste matter off from the hopper 27. As shown in Figs. 1 and 2 the reel is provided with a plurality of longitudinally shiftable wiper disks or cleaners 35, said disks being of substantially the same diameter as the reel and having therein a plurality of perforations corresponding to the spacing and arrangement of the wires 34, and also a main central opening for accommodating the shaft 26. Ordinarily a set of three of these disks may be employed although it will of course be understood that any desired number may be used when the capacity of the machine requires more than this number. And, at the beginning of the separating operation these disks all preferably occupy a position at the gear end of the reel so that at any time during the de-silking and separating operation that the wires become contaminated or foul, one of the disks 35 may be shifted longitudinally across the hopper and carry along with it all of the material on the wires to a point beyond the limit of the hopper 27, where the waste may be removed from the wires by the use of a stream of water from a hose, or any other convenient and available means. After the vats have been emptied of their contents and all of the wires have been cleaned by the shifting of the wiper disks toward the waste end of the reel, the disks 35 may then be returned to the opposite end of the reel before the next operation starts, as there is usually some few minutes required between the complete emptying of the vats and the refilling, mixing and heating for the next screening operation. This time interval permits of thoroughly cleaning the de-silking unit S for the subsequent operation.

From the foregoing it is believed that it will be apparent that the invention provides a simple and practical means for removing silk and like particles from the corn as it passes from the cutting machine to the cooker, and in this connection it is to be mentioned that an important and distinctive feature of the invention resides in preheating or preliminarily subjecting the mass of raw corn to such a heat as will render the foreign particles lifeless or flaccid whereby when they encounter the wires of the separating or de-silking reel, they will be easily detained or held back from the mass of good corn which passes on to receive its final cooking. This apparatus not only saves considerable time in the canning operation as well as effectively cleaning the mass of corn, but at the same time the heating of the raw corn which has primarily in view the rendering of the silk limp and lifeless, also facilitates the final cooking operation because of the latent heat which remains in the corn after this first heating.

From the foregoing description it will appear that while the applicant's invention possesses special utility in its application for separating and removing the silk, husks and hard shells from a mass of edible corn, it will also be applicable in the treatment and preparation of equivalent food products wherein it is desirable to provide a practical method and appartaus for separating or segregating the fibrous from the non-fibrous material in a mass of food product. In this connection it will be understood that the term "non-fibrous material", as employed herein refers to the edible part of the food product such as the kernels of corn, and the term "fibrous material" refers to the waste or non-edible parts of the product such as corn silk, husks and shell particles.

I claim:

1. An apparatus for de-silking corn comprising means for subjecting the raw corn *en masse* to a sterilizing heat to effect a devitalization of the silk, and a separator arranged to receive the heated mass of material and having means for trapping and collecting the flaccid silk.

2. An apparatus for removing silk, husk, and like particles from a comminuted mass of raw corn, including a vat for heating said mass and a rotatable reel including a plurality of spaced longitudinally disposed wires arranged in the path of discharge of the comminuted mass from the vat.

3. An apparatus for removing silk, husk, and like particles from a comminuted mass of raw corn, including a vat for heating the raw corn, and a separating unit disposed in the path of the discharge from the vat including means for arresting or detaining the silk, husk and like particles, while permitting the mass of corn to pass therethrough.

4. An apparatus for removing silk, husk, and like particles from a comminuted mass of raw corn, including a heating vat for rendering the silk flaccid, and a de-silking reel including a plurality of spaced wires parallel to its axis, and so arranged that the corn discharged from the vat passes diametrically therethrough.

5. An apparatus for removing silk, husk, and like particles from a comminuted mass of raw corn, including a vat, a steam connection thereto for heating a mass of raw corn placed therein, a combined conveyer and agitator in the vat, a separating unit arranged in the path of the mass discharged from the vat and including a plurality of longitudinally disposed wires and means for synchronously rotating the reel and combined conveyer and agitator.

6. An apparatus for removing silk, husk, and like particles from a comminuted mass of raw corn, including a heating unit for the raw corn having a discharge spout, and a de-silking unit including a rotatable de-silking reel arranged in the path of discharge from said spout, and means for removing the silk collected by said reel from the zone of discharge of the corn therethrough.

7. An apparatus for de-silking corn including a closed vat having its bottom inclined at one end and adjacent thereto a discharge spout, a controlling gate for said spout, a combined screw feed agitator and conveyer rotatably supported within the vat, a steam distributing jet arranged at an intermediate point in the bottom of the unit and a sealing cover therefor.

8. In an apparatus for de-silking corn including a vat unit having a discharge spout projecting from one end, and a separating unit disposed below the vat unit and including a separating reel having its axis arranged at right angles to the longitudinal center of the vat unit and in the path of discharge from said spout thereof.

9. An apparatus for de-silking corn including a vat unit for heating corn, and a separating unit consisting of a hopper having an inclined bottom and a discharge outlet, a separating reel journaled in the hopper and including a plurality of longitudinally disposed and spaced wires, said separating reel projecting through and beyond one of the side walls of the hopper, and means carried by the reel for displacing the foreign matter collected by said wires to the end of the reel beyond the hopper.

10. An apparatus for de-silking corn including a vat unit for heating corn, and a separating unit consisting of a hopper having an inclined bottom and a discharge outlet, a separating reel journaled in the hopper and including a plurality of longitudinally disposed and spaced wires, said separating reel projecting through and beyond one of the side walls of the hopper, and a plurality of shiftable cleaner disks slidable on the wires of the reel, whereby when the same are shifted toward the end of the latter projecting beyond the hopper, waste material clinging to the wires will be removed from the zone of separation.

11. An apparatus for de-silking corn including a vat unit for subjecting the corn to a devitalizing heat, a separating unit for coöperating with said vat unit and including a hopper, a relatively long separating reel arranged longitudinally within the hopper and projecting beyond one end thereof, said reel consisting of a shaft, end walls carried thereby, tie rods connecting the end walls, and a multiplicity of spaced wires strung between the end walls.

12. A machine for separating the fibrous material from non-fibrous material in a mass of food product including a reel having a plurality of longitudinal fiber trapping members arranged in variable spaced relation to the axis of the reel, and means for removing the material trapped by said members.

13. A machine for separating the fibrous from the non-fibrous material in a mass of food product including a reel having a plurality of longitudinal wires arranged in spaced relation to the axis of the reel, and a cleaner member arranged longitudinally lengthwise of said wires.

14. A machine for separating the fibrous material from the non-fibrous material in a mass of food product including a reel having a horizontal axis and a plurality of longitudinal wires arranged in spaced relation around said axis, a cleaner member movable lengthwise of said wires, and a hopper arranged underneath only a part of said reel.

15. The herein described method of separating the fibrous from the non-fibrous material in a mass of food product, which consists in first treating the mass to render the fibrous material more readily separable from the non-fibrous material, and subsequently withdrawing the fibrous material from the non-fibrous material.

16. The herein described method of separating the fibrous from the non-fibrous material in a mass of food product which consists in first treating the mass to render the fibrous material flaccid, and subsequently withdrawing the flaccid material from the non-fibrous material.

17. The herein described method of separating the fibrous from the non-fibrous material in a mass of food product which consists in first treating the mass to heat to render the fibrous material more readily separable from the non-fibrous material, and subsequently withdrawing the fibrous material from the non-fibrous material.

18. The herein described method of separating the fibrous from the non-fibrous material in a mass of food product which consists in first treating the mass to heat to devitalize the fibrous material, and subsequently withdrawing the devitalized material from the non-fibrous material.

19. The herein described method of desilking corn which consists in heating the mixture of edible and waste portions removed from the cob so as to render the waste portions flaccid, and then withdrawing the flaccid waste portions from the corn.

20. The herein described method of desilking corn which consists in heating the mass of edible and non-edible portions of the mixture at a temperature which will render the non-edible portions flaccid but not cook the edible portions, and then withdrawing the edible from the non-edible portions of the mixture.

21. The herein described method of desilking corn which includes heating the mixture, kernels and waste matter, such as silk, husk and shells, seasoning said mixture while being heated, and then withdrawing the flaccid waste matter from the corn.

22. The herein described method of desilking corn which includes heating and agitating the mixture of kernels and waste matter such as silk, husks and shells, and then withdrawing the flaccid waste matter from the corn.

23. The herein described method of desilking corn which consists in heating, agitating and seasoning the mixture of kernels and waste matter, such as silk, husks and shells, and then withdrawing the kernels from the waste matter.

24. The herein described method of treating corn which consists in heating the mass of kernels and waste matter at a temperature which will render the waste matter limp but not cook the kernels, and then withdrawing the kernels from the waste matter.

In testimony whereof I hereunto affix my signature in the presence of two witnesses.

LOUIS C. GEHRING.

Witnesses:
M. A. SWEETMAN,
CHARLES H. MAY.

Copies of this patent may be obtained for five cents each, by addressing the "Commissioner of Patents. Washington, D. C."